Sept. 30, 1969  P. MICHELS ET AL  3,470,050

METHOD OF MAKING A RESILIENT REINFORCED CONVEYOR BELT

Filed Feb. 1, 1966

INVENTORS
PETER MICHELS
HORST ENGEL
BY

United States Patent Office 3,470,050
Patented Sept. 30, 1969

3,470,050
METHOD OF MAKING A RESILIENT
REINFORCED CONVEYOR BELT
Peter Michels, Hannover, and Horst Engel, Sarstedt, Germany, assignors to Continental Gummi-Werke Aktiengesellschaft, Hannover, Germany
Filed Feb. 1, 1966, Ser. No. 523,987
Claims priority, application Germany, Jan. 29, 1965,
C 34,974
Int. Cl. B32b 31/08; C09j 5/00
U.S. Cl. 156—164                            8 Claims

ABSTRACT OF THE DISCLOSURE

In making a resilient conveyor belt having reinforcing inserts embedded therein, a tensile stressing is applied variably in differing width areas in progressive longitudinal sections with respect to divisional pieces by means of one cover strip of collective width corresponding to width of a conveyor belt followed by completion of vulcanization of assembled parts to be finished during maintenance of said tensile stressing. The tensile stressing continues until essentially equal stressing conditions occur and are maintaineed in reinforcing inserts of all divisional pieces collectively and at least until repetition thereof in periodic effectiveness upon the divisional pieces subjected to said tensile stressing.

---

The present invention relates to a method of and device for making conveyor belts of natural or synthetic rubber material, which comprise reinforcing inserts while the unvulcanized conveyor belt is composed of a plurality of continuous sections each of which has a width less than the total width of the completed belt.

Heretofore known methods and devices for producing conveyor belts of the above mentioned type have the drawback that differences in the length between the sections to be connected to each other, and consequently warping, deformations and the formation of corrugations on the completed conveyor belt can not be excluded.

When during the successive vulcanization steps on the individual conveyor belt sections small differences in length occurred each of which could not be observed optically, these irregularities added up over the total length of such belt to such an extent that the finish vulcanized conveyor belt prior to its employment had to be subjected to expensive operations or in some instances even had to be rejected entirely.

It is, therefore, an object of the present invention to provide a method of an device for making conveyor belts of the above mentioned type, which will overcome the drawbacks listed above.

It is another object of this invention to provide a method of and device for making conveyor belts of the above mentioned type of a great width which cannot be built up in a single operation with heretofore known devices, in such a way that differences in length between the sections placed against each other, and thus warping and the formation of corrugations on the finished conveyor belt will be avoided.

Figure 1:
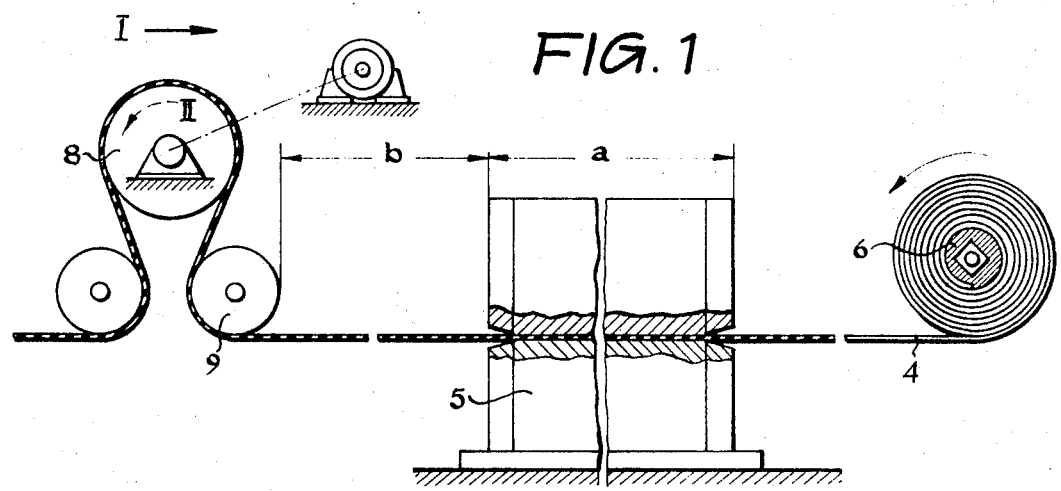

These and other objects and advantages of the invention will appear more clearly from the following specification in connection with the accompanying drawing, in which:

FIG. 1 diagrammatically illustrates an arrangement for making belts according to the present invention.

Figure 2:
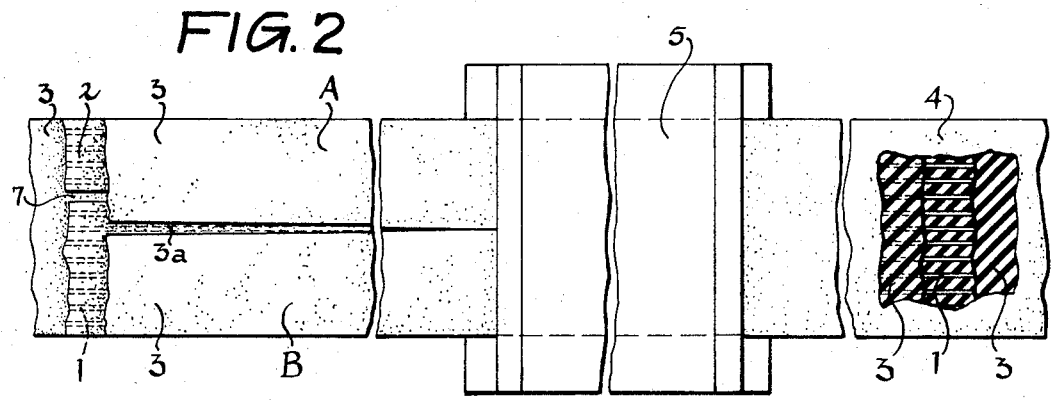

FIG. 2 is a top view of a portion of a conveyor belt showing the merging phase between the raw and finished condition.

Figure 3:
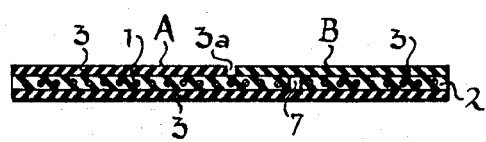

FIG. 3 on a larger scale than FIGS. 1 and 2 illustrates a cross section through a raw conveyor belt according to the invention.

Figure 4:
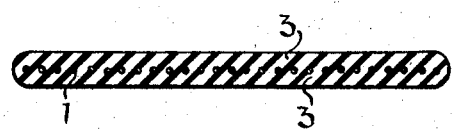

FIG. 4 is a cross section similar to that of FIG. 3 but through a finished conveyor belt according to the invention.

The present invention is characterized primarily in that during the manufacture of the belt according to the invention, the sections are over successive length portions subjected to a tensile stress variable over the width of said sections whereupon the sections are fitted together and are finish vulcanized in a heated press. Advantageously, the raw belt is, between successive heat treatments, clamped on or within the range of the press and has sections of a length equalling at least the effective length of the press subjected to a tensile stress.

The particular advantage of the method according to the present invention consists in that the prepared sections of the raw belt are, only after complete equalization of all differences in length, fitted together finally and are vulcanized in the press. The equalization in length is effected again for each belt section to be vulcanized so that the completed or finished conveyor belt will over its entire length have no disadvantageous inner tensions and, therefore, without requiring time-consuming post-operations, will when in operation move straight in a proper way.

For the practice of the method according to the invention, it is immaterial in which form the sections are prepared and are composed to the raw belt of the desired width. In other words, the sections may be prepared completely separately from each other, and each section may have its layers superimposed independently of another section, while the said sections are only immediately prior to entering the press, brought into contact with each other. As far as the manufacturing devices will permit, it is also possible that the separately manufactured sections with the strength-imparting reinforcing inserts to be covered with a cover plate extending in a continuous way over the total width of the conveyor belt at one or both sides of the sections, and that only thereafter during the further course of the manufacturing process, the sections are subjected to a tensile stress. It is important in each instance that the reinforcing inserts associated with the individual sections will be able in view of the tensile stress exerted thereupon to displace themselves relative to each other in the longitudinal direction of the belt, because only in view of such limited movements of the reinforcing inserts proper it is possible to reduce or eliminate the respective differences in length.

A device according to the present invention for practicing the new method of this invention comprises a drum which is arranged in spaced relationship to and ahead of the press when looking in the direction of movement of the raw belt. This drum is frictionally engaged by the raw belt which passes over said drum, while said drum is adapted to be rotated in a direction opposite to the direction of movement of the raw belt. By means of such a device it is possible by differently affecting the frictional coefficient between the raw belt and the drum surface in different zones of the width of the raw belt to produce different tensile stresses in the reinforcing inserts. This may be effected, for instance, by placing friction-increasing or friction-reducing means upon the drum surface or the surface of the raw belt on the drum or by inserting into the looping section substances which have the tendency to increase the diameter. As friction-increasing or friction-reducing means may be used for instance talcum or other powder, oil or grease, whereas, as substances for increasing the diameter may be used textile liners or synthetic film strips. In these circumstances, the sections to be lengthened will still be moved by the driven drum even when the latter already slips with regard to the zones of width which are not to be stretched any further.

The same effect may also be obtained by placing the slip into the drum itself. To this end, the outer surface of the drum may in axial direction thereof be sub-divided into portions which are rotatable relative to each other. The individual drum portions may be driven independently of each other or the individual drives for said portions may be coupled to each other so that they can slip, for instance by means of electrically interconnected individual motors, or the individual portions may be driven in common by a drive motor through the intervention of mechanical friction clutches, magnetic or hydrodynamic coupling elements or other suitable means so that they can slip relative to each other. In connection with the practice of the method according to the invention, the arrangement of the drum with regard to the heated press is of importance. According to one feature of the present invention, the distance between the drum and the heated press should be at least equal to the effective length of the press. This distance is the minimum but may be increased up to the multiple of the length of the press. For engaging and clamping the raw belt with regard to the driven drum, the customary clamping devices on the press, the press itself, or devices behind the press may be employed.

Referring now to the drawing in detail, the conveyor belt illustrated in FIGS. 3 and 4 is made of rubber material and has a pulling force-transmitting core comprising a purality of parallel steeel wires or cables 1 which do not contact each other and are embedded in a relatively soft rubber layer 2 which has the tendency to bond, said wires or cables 1 forming the strength layer of the belt. Core 1, 2 is covered toward the top and toward the bottom by cover plates 3 of a viscous hard or tough wear-resistant rubber mixture. Conveyor belts of this type are, due to their characteristic core structure, called steel wire conveyor belts. However, the invention is not limited to this particular type of conveyor belt but also embraces conveyor belts of different composition and with additional fabric layers or other reinforcing layers.

The manufacture of the said steel wire conveyor belt is preferably started with two sections A and B each having approximately half the width of the finished belt 4. Both sections A and B are independently and separately from each other built up in customary manner from the steel wire core 1, 2 with the cover plates 3 pertaining thereto and in raw condition are fed into the vulcanizing press 5 which the finished conveyor belt 4 leaves by sections in the direction of the arrow I in conformity with the rhythm of the vulcanizing operations. The finished conveyor belt 4 is then wound upon the driven withdrawing drum 6.

In the specific embodiment shown in the drawing, the sections A, B are built up of a unitary undivided lower cover plate 3. However, it is also possible from the start to employ a continuous upper cover plate having the full width, if this should be required for some reasons. It is of importance that the core portions 1, 2 which are built up independently of each other will be displaceable relative to each other in order to equalize or compensate for differences in length. This movability, which is important for the practice of the method according to the present invention, is indicated in FIGS. 2 and 3 by the spacing 7 between the two sections A and B. The gap 3a of the upper cover plate 3 is in transverse direction offset to gap 7 in order to avoid an alignment of the two gaps of butt sections. Such overlapping is also desirable from the vulcanizing standpoint but does not form a part of the present invention. The movability of the sections relative to each other may, if it should be so desired, be assured by inserting spacer means for instance in the form of a fabric strip, into the gap 7. As soon as the compensation or equalization in length has been obtained, the spacer means is removed from section B of the raw belt.

According to the diagrammatic representation of the device according to the invention as illustrated in FIG. 1, the effective length of the vulcanizing press 5, i.e. the effective range for a vulcanizing operation in the longitudinal direction of the belt is designated with the letter $a$. At a distance $b$ which is at least equal but preferably exceeds the distance $a$ and in extreme instances may be a multiple of the distance $a$, there is provided a stretching device in the form of a stationarily driven drum 8 with reversing drums 9. As will be seen from the drawing, the drums 8 and 9 are arranged ahead of press 5 when looking in the direction of movement of the belt as indicated by the arrow I. The two-sectional raw conveyor belt is looped around the surface of drum 8 over a wide arch and subsequently passes into vulcanizing press 5 in which in view of the vulcanization of the elastic material, the two sections A, B are interconnected to a homogeneous belt.

Drum 8 representing the stretching device, is in the simplified arrangement of FIG. 1 designed as a rigid cylindrical drum with variable drive for instance drivingly connected to a variable motor M. Of course, any desired transmission (not shown) may be provided between the motor M and drum B. In view of its rotation in the direction of the arrow II, drum 8 exerts a pulling effect upon the raw belt clamped into press 5, said pulling effect on the belt depending on the friction between drum surface and belt. With the illustrated arrangement, it is thus possible to affect the frictional coefficient in such a way that, depending on the prevailing conditions, either the section A or the section B or certain zones within the sections will be stretched to a greater extent until within section $b$ there will be obtained in strength carriers 1 a uniform or approximately uniform condition of tension over the entire width of the raw belt. This is approximately the case when the non-supported portion of the raw belt in section $b$ shows the same sag throughout section $b$. The thus pretreated raw belt is then introduced into press 5 and finish vulcanized.

While the material for the cover plates 3 may be made of any suitable viscous hard or tough wear resistant mixture, a material such as Neoprene or other synthetic rubber, blended with natural rubber compositions has proved particularly advantageous in this connection.

While the tensile stress to which the belt sections are subjected naturally depends on the material of the belt sections and the thickness thereof and in particular the reinforcing insert means, merely by way of example it may be mentioned that with a belt section having a length of 25 to 30 feet and comprising as reinforcing inserts up to 200 steel wire sections over the entire width, a tensile stress of about 5,000 kilograms may be employed.

What we claim is:

1. A method of making a conveyor belt from natural and synthetic rubber materials, which includes the steps of: preparing a plurality of belt strips containing strength-imparting reinforcing inserts, each of said strips having a width equalling a fraction of the desired total width of the belt to be made, subjecting the obtained strips of fractional width stepwise over successive sections to a tensile stressing variable over the width of said strip sections so as to equalize as to length each individual stress section over its entire width, placing the thus length-equalized strip sections of a plurality of belt strips lengthwise in edge to edge facing a relationship with each other to make up the desired total width of the belt to be produced during said tensile stressing, and vulcanizing stepwise and sectionwise the thus obtained composite belt sections.

2. A method according to claim 1, which includes the step of: prior to the vulcanization of each composite belt section subjecting the same to said tensile stressing variable over the entire width of the respective composite belt section so as to equalize by stressing the respective composite belt section as to length over total width thereof.

3. A method according to claim 1, which includes the step of: exerting tensile stressing upon the strip sections until approximately the same tensile stressing conditions prevail in the reinforcements of all of the strip sections collectively.

4. A method according to claim 1, which includes the step of: keeping the reinforcing inserts of the individual strip sections spaced separately from each other at least until the applied tensile stressing has become effective collectively.

5. A method according to claim 1, which includes the step of: prior to vulcanizing the belt strips covering at least one side thereof by cover strip means for applying said tensile stressing.

6. In a method of making a conveyor belt from neutral and synthetic rubber materials with reinforcing inserts extending in the form of longitudinal wires, ropes, cables and the like embedded between cover strips whereby belt parts to be finished consist of at least two narrow divisional pieces assembled with adjoining longitudinal edges and are vulcanizable in a vulcanizing press in progressive longitudinal sections, the improvement therewith which comprises the steps of tensile stressing variably in differing width areas in progressive longitudinal sections subjected upon the divisional pieces with one cover strip of collective width corresponding to width of the belt, and subsequently completing vulcanization of the assembled parts to be finished.

7. A method according to claim 6, in which said tensile stressing is subjected upon the assembled belt parts to be finished with subsequent vulcanization fully restrained in the scope of the vulcanizing press and at the time upon longitudinal sections of a length corresponding at least to the effective length of the vulcanizing press.

8. A method according to claim 6, in which said tensile stressing continues until essentially equal stressing conditions occur and are maintained in reinforcing inserts of all divisional pieces collectively and at least until repetition thereof in periodic effectiveness upon the divisional pieces.

References Cited

UNITED STATES PATENTS

| | | | |
|---|---|---|---|
| 3,247,038 | 4/1966 | Kraft | 156—229 XR |
| 3,272,680 | 9/1966 | Paasche | 156—160 XR |
| 1,978,912 | 10/1934 | Repony et al. | 156—229 XR |
| 2,520,699 | 8/1950 | Sowerby et al. | 156—229 XR |
| 3,230,125 | 1/1966 | Hicks | 156—229 |
| 2,052,285 | 8/1936 | De Rabot | 156—229 |
| 2,518,137 | 8/1950 | Gorecki | 18—38 |
| 2,602,188 | 7/1952 | Gorecki | 18—38 |

EARL M. BERGERT, Primary Examiner

PHILIP DIER, Assistant Examnier

U.S. Cl. X.R.

156—324, 494, 544, 304, 229; 161—36